United States Patent [19]
Lin et al.

[11] Patent Number: 5,742,703
[45] Date of Patent: Apr. 21, 1998

[54] METHOD AND APPARATUS FOR THE RESOLUTION ENHANCEMENT OF GRAY-SCALE IMAGES THAT INCLUDE TEXT AND LINE ART

[75] Inventors: Ying-Wei Lin, Penfield; Robert P. Loce, Webster; Michael Branciforte, Rochester, all of N.Y.

[73] Assignee: Xerox Corporation, Stamford, Conn.

[21] Appl. No.: 540,998

[22] Filed: Oct. 11, 1995

[51] Int. Cl.$^6$ .............. G06K 9/34; G06K 9/62; G06T 5/00; H04N 1/40
[52] U.S. Cl. .............. 382/176; 382/209; 382/254; 358/462
[58] Field of Search .............. 382/209, 217, 382/218, 173, 176, 254, 266, 270; 358/462, 456, 447, 465, 466

[56] References Cited

U.S. PATENT DOCUMENTS

| | | |
|---|---|---|
| 4,437,122 | 3/1984 | Walsh et al. . |
| 4,544,264 | 10/1985 | Bassetti et al. . |
| 4,841,375 | 6/1989 | Nakajima et al. . |
| 4,847,641 | 7/1989 | Tung . |
| 4,996,603 | 2/1991 | Kanemitsu et al. ............ 358/462 |
| 5,001,576 | 3/1991 | Tanaka et al. ............ 358/462 |
| 5,005,139 | 4/1991 | Tung . |
| 5,072,291 | 12/1991 | Sekizawa . |
| 5,101,438 | 3/1992 | Kanda et al. ............ 382/176 |
| 5,134,495 | 7/1992 | Frazier et al. . |
| 5,138,339 | 8/1992 | Curry et al. . |
| 5,150,311 | 9/1992 | Long et al. . |
| 5,153,925 | 10/1992 | Tanioka et al. ............ 382/272 |
| 5,206,741 | 4/1993 | Shimura et al. . |
| 5,270,836 | 12/1993 | Kang . |
| 5,282,057 | 1/1994 | Mailloux et al. . |
| 5,301,037 | 4/1994 | Kang et al. . |
| 5,359,423 | 10/1994 | Lou . |
| 5,485,289 | 1/1996 | Curry ............ 358/462 |

OTHER PUBLICATIONS

Leo Steidel; Resolution Enhancement Technologies for Laser Printers; pp. 1–14.

J. F. Moreland; A Survey of Electronic Techniques for Pictorial Image Reproduction; IEEE Transactions on Communications, vol. Com–29, No. 12 Dec. 1981.

Primary Examiner—Scott A. Rogers
Attorney, Agent, or Firm—Duane C. Basch

[57] ABSTRACT

The present invention is a method and apparatus for resolution enhancement of gray-scale input images including text and line art, and more particularly to a filtering method and image processing apparatus for enhancement of high contrast line edges found in continuous tone (gray-scale) images without requiring that the input image data include predetermined tag bits to identify region types (e.g., continuous tone or text and line art).

17 Claims, 7 Drawing Sheets

METHOD AND APPARATUS FOR THE RESOLUTION ENHANCEMENT OF GRAY-SCALE IMAGES THAT INCLUDE TEXT AND LINE ART

This invention relates generally to a method and apparatus for the resolution enhancement of gray-scale images that include text and line art, and more particularly to a filtering method and image processing apparatus for enhancement of high contrast line edges found in continuous tone (gray-scale) images without the necessity of predetermined tag bits from page description language processors.

CROSS REFERENCE

The following related patents are hereby incorporated by reference for their teachings:

"Method for Design and Implementation of an Image Resolution Enhancement System That Employs Statistically Generated Look-Up Tables," Loce et al., U.S. Pat. No. 5,696,845; and "Gray Pixel Halftone Encoder," T. Jacobs et al., U.S. Pat. No. 5,479,263.

BACKGROUND AND SUMMARY OF THE INVENTION

Information systems for handling numerous document and data formats are moving towards becoming open systems where different devices are tied to one another to provide solutions to customers' needs. Furthermore, printing systems must now adaptively accept digital documents in a plurality of image formats and render such documents in a consistent and high quality fashion. The present invention, therefore, is directed to enabling the enhanced printing of electronic documents comprising gray-scale image information that has been digitized; particularly image data representing complex documents (e.g., contone, pictorial and textual regions) so that the resulting print is rendered with high quality text, line art, tints and pictorials, and furthermore, when appearance matching is desired, the consumer does not perceive a difference between versions of the document printed by a printer possessing the present invention and another desirable printer. In order to accommodate a variety of image formats and resolutions, efficient methods of accurately enhancing image resolution are required to take advantage of the technology. Hence, raster conversion technology, where a bitmap created at a first output resolution is altered so as to be printable at a second output resolution, has become an important aspect of the open system technology.

Heretofore, a number of patents and publications have disclosed the resolution enhancement of binary images including text and line art, the relevant portions of which may be briefly summarized as follows:

U.S. Pat. No. 4,847,641 and U.S. Pat. No. 5,005,139 to Tung disclose print enhancement circuitry for a laser beam printer. The bit map of a region of the image to be output is compared to a number of patterns or templates. When a match is detected, a section of the bitmap that was matched is replaced with a unique bitmap section designed to compensate for digitization errors. The replacement bitmap section may include predetermined shifting of some dot positions to compensate for the digitization error in the original bitmap section.

U.S. Pat. No. 5,138,339 to Curry et al. teaches methods and means for increasing the precision with which optical printers that utilize high gamma recording media, such as xerographic printers, spatially position transitions in the images they print. The invention provides microaddressable display systems for rendering two-dimensional exposure images on photosensitive media. The microaddressability results from the overscanning of intensity modulated spots that superimpose multiple discrete exposures on the recording medium, wherein the separation of the of the exposure centers is significantly less than the spatial diameter of the spots.

L. Steidel in *Technology Overview: Resolution Enhancement Technologies for Laser Printers*, LaserMaster Corp., discusses three currently available implementations for vertical resolution enhancement, Resolution Enhancement Technology, Paired Scan Line Scheme, and TurboRes. In all cases, the horizontal resolution of the laser scanner is increased by increasing the clock speed. On the other hand, the vertical resolution is enhanced by combining the weaker laser energy from a relatively brief laser flash at the periphery of an adjacent pixel on a second scan line.

James C. Stoffel et al. in *A Survey of Electronic Techniques for Pictorial Image Reproduction*, IEEE Transactions on Communications, Vol. COM-29, No. 12, December 1981, incorporated by reference for its teachings, discloses image processing algorithms that can be used to transform continuous tone and halftone pictorial image input into spatially encoded representations compatible with binary output processes. A set of image quality and processing complexity metrics are also defined so as to evaluate a number of image processing algorithms with respect to their ability to reproduce continuous tone or halftone pictorial input.

Furthermore, template-based binary resolution enhancement and conversion has been addressed by others such as R. Eschbach application Ser. No. 08/169,483, H. Kang U.S. Pat. No. 5,270,836, issued Dec. 14, 1993 and U.S. Pat. No. 5,301,037, issued Apr. 5, 1994, and L. Mailloux U.S. Pat. No. 5,282,057, issued Jan. 25, 1994, and by Loce et al. in U.S. Pat. No. 5,579,445 for "Image Resolution Conversion Method that Employs Statistically Generated Multiple Morphological Filters," and U.S. Pat. No. 5,680,485 for a "Method and Apparatus Employing Erosion-Based Filter Pairs for Image Mapping," all of which are hereby incorporated by reference. The present invention differs from that body of work in that it is a method and apparatus directed to performing text and line-art enhancement on an image while the tint and pictorial data is rendered as a high addressability halftone, and where the image contents are represented in gray-scale form.

In accordance with the present invention, there is provided an image processing apparatus for resolution enhancing a gray-scale digital image input thereto, the image including text and line art represented as a plurality of digitized gray-scale values, comprising: a first channel, including a binarization circuit to binarize the gray-scale digital image and produce a binary image, and a pattern matcher for receiving the binary image and producing both a tag signal, active only when a segment of the binary image matches one of a set of template patterns, and a first high-addressability enhanced output signal; a second channel, parallel to the first channel, for receiving the gray-scale digital image and producing a second high-addressability enhanced output signal; and a selector, responsive to the tag signal generated by the first channel pattern marcher, for selecting the high-addressability enhanced output signals from the first or second channels and outputting the selected output signals to a marking engine to produce a resolution enhanced output print.

In accordance with another aspect of the present invention, there is provided a method for resolution enhancing a gray-scale digital image, the image including text and line art represented therein as a plurality of gray-scale values, comprising the steps of: (a) thresholding the gray-scale digital image to produce a binary image; (b) comparing a segment of the binary image to the set of template patterns and producing a first high-addressability enhanced output signal in response to a match between the segment and one of the set of predefined patterns; (c) producing an active tag signal whenever the segment of the binary image matches one of the set of predefined patterns; (d) producing, in response to the gray-scale digital image, a second high-addressability enhanced output signal representing a screened value for a plurality of sub-pixel elements of the output image; and (e) selecting, in response to the active tag signal generated in step (c) the first high-addressability output signals for output as resolution enhanced high-addressability output, otherwise selecting the second high-addressability output signals for output.

In accordance with yet another aspect of the present invention, there is provided a digital printing apparatus, comprising: an image processor for resolution enhancing a gray-scale digital image input to the digital printing apparatus, the image having text and line art regions represented as a plurality of digitized gray-scale values, said digital printing apparatus including a first channel, including a binarization circuit to binarize the gray-scale digital image and produce a binary image, and a pattern matcher for receiving the binary image and producing both a tag signal, active only when a segment of the binary image matches one of a set of template patterns, and a first high-addressability output signal, a second channel, including a high-addressability screening circuit, for receiving the gray-scale digital image and producing a second high-addressability output signal, and a selector, responsive to the tag signal generated by the first channel pattern matcher, for selecting the high-addressability output signals from either the first or the second channel and outputting the selected output signals; and a high-addressability marking engine, receiving output signals from said image processor, to produce a resolution enhanced high-addressability output print in response to the selected output signals output by said selector.

One aspect of the invention deals with a basic problem in document printing, that of separating or segmenting text or line art regions of a document image from continuous tone regions when all are mixed in a complex document.

This aspect is further based on the discovery of a technique that alleviates the problem of requiring a page description language or alternative image representation to provide tag bits that identify the type of image in particular regions of the document. The technique accepts multi-bit-per-pixel (e.g., gray-scale) images and produces high-addressability output signals for rendition of the image. In addition, the technique further analyzes a binarized representation of the gray-scale input in order to identify those regions that represent line art or textual regions. Those regions may then be represented as enhanced high-addressability binary images while the continuous tone regions are represented as high-addressability halftone output. Accordingly, this technique alleviates the need for the PDL to provide additional tag bits to pre-identify image regions for subsequent enhancement processing.

The technique described above is advantageous because it makes it unnecessary to have tag bits associated with the input image data to pre-identify image regions. In addition, it can be used to output resolution enhanced signals for rendition by high-addressability printing engines.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

The term "data" refers herein to physical signals that indicate or include information. When an item of data can indicate one of a number of possible alternatives, the item of data has one of a number of "values." For example, a binary item of data, also referred to as a "bit," has one of two values, interchangeably referred to as "1" and "0" or "ON" and "OFF" or "high" and "low." A bit is an "inverse" of another bit if the two bits have different values. An N-bit item of data has one of $2^N$ values.

The term "data" includes data existing in any physical form, and includes data that are transitory or are being stored or transmitted. For example, data could exist as electrical, electromagnetic or other transmitted signals or as signals stored in electronic, magnetic, or other form. The terms image signal, video data, and pixel are interchangeably used herein to describe discrete digital signals that represent the active (on) or inactive (off) state of an element within a digital image. In addition, shaded or cross-hatched portions of image bitmaps depicted herein are intended to represent black or active pixels (having a value of 1 in a binary representation) within the bitmaps. Such a representation is not intended to limit the present invention, but to simplify the description thereof. Accordingly, the present invention may be operated in the same manner by substituting white pixel states wherever black pixels are indicated, and vice versa.

"Circuitry" or a "circuit" is any physical arrangement of matter that can respond to a first signal at one location or time by providing a second signal at another location or time. Circuitry "stores" a first signal when it receives the first signal at one time and, in response, provides substantially the same signal at another time. Circuitry "transfers" a first signal when it receives the first signal at a first location and, in response, provides substantially the same signal at a second location. An example of a circuit is a data or address bus in an electromechanical system such as a printing system or computer.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

A "data processing system" is a physical system that processes data. An "image processing system" is a data processing system that processes image data. A "data processor" or "processor" is any component or system that can process data, and may include one or more central processing units or other processing components.

An "array of data" or "data array" or "array" is a combination of items of data that can be mapped into an array. A "two-dimensional array" is a data array whose items of data can be mapped into an array having two dimensions.

An item of data "defines" an array when it includes information sufficient to obtain or produce the array. For example, an item of data defining an array may include the defined array itself, a compressed or encoded form of the defined array, a pointer to the defined array, a pointer to a part of another array from which the defined array can be obtained, or pointers to a set of smaller arrays from which the defined array can be obtained.

"Control circuitry" is circuitry that provides data or other signals that determine how other components operate. For example, "instruction circuitry" is control circuitry that provides items of data indicating instructions to a component that includes processing circuitry. Similarly, "addressing circuitry" is control circuitry that provides items of data indicating addresses to a component that includes memory circuitry.

Control circuitry provides signals that "control" transfer of data by bus circuitry if the signals determine sources and destinations of the transfers of data by the bus circuitry. For example, the control circuitry could provide signals to a source so that it provides an item of data to the bus circuitry; the control circuitry could also provide signals to one or more destinations so that they receive the item of data from the bus circuitry.

An "image" is a pattern of physical light. An image may include characters, words, and text as well as other features such as graphics. A text may be included in a set of one or more images, such as in images of the pages of a document. An image may be divided into "segments," each of which is itself an image. A segment of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image.

Each location in an image may be called a "pixel." Hence, a "pixel" is the smallest segment into which an image is divided or accessed in a given system. In an array defining an image in which each item of data provides a value, each value indicating the color of a location may be called a "pixel value". Each pixel value is, for example, a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. The invention will hereafter be described in terms of a single-color gray-scale embodiment, however, there is no intent to limit the invention to such a single-color system as it has application to multicolor systems as well.

An item of data "relates to" part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

An operation performs "image processing" when it operates on an item of data that relates to part of an image.

Pixels are "neighbors" or "neighboring" within an image when there are no other pixels between them and they meet an appropriate criterion for neighboring. If, for example, the pixels are rectangular and appear in rows and columns, each pixel may have 4 or 8 adjoining neighboring pixels, depending on the criterion used.

An "image input terminal" (IIT) or "image input device" is a device that can receive an image and produce an item of data defining a version of the image. A "scanner" is an image input device that receives an image by a scanning operation, such as by rasterizing a document.

An "image output device" (ITO) is a device that can receive an item of data defining an image and provide the image as output. A "display" and a "printer" are examples of an image output device that provides the output image in human viewable form. The visible pattern presented by a display is a "displayed image" or simply "image." The visible pattern presented by a printer is a "printed image" or simply "print" or "output."

Figure 1:
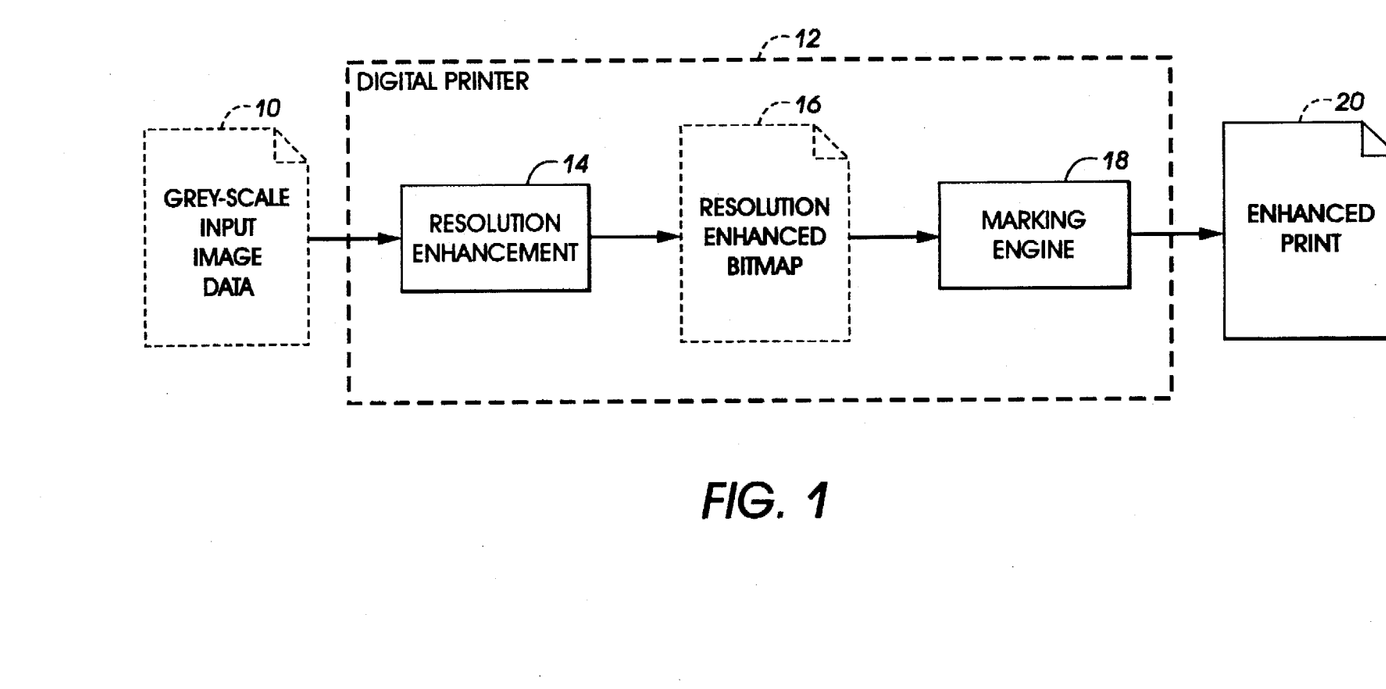
FIG. 1 is a block diagram of a digital printer embodiment suitable for employing the present invention.

FIG. 1 is a block diagram of a digital printer that illustrates a preferred embodiment of the present invention. As shown, a gray-scale image 10 is presented to a digital printer 12 to produce printed output in the form of an enhanced print 20. Within the digital printer employing the present invention is resolution enhancement circuit 14 that transforms the input bitmap into a resolution enhanced bitmap image 16. The enhanced bitmap image is then passed to marking engine 18 for exposure and development, as will be generally described with respect to the raster output scanning system of FIG. 5, to produce enhanced output print 20.

Figure 2:
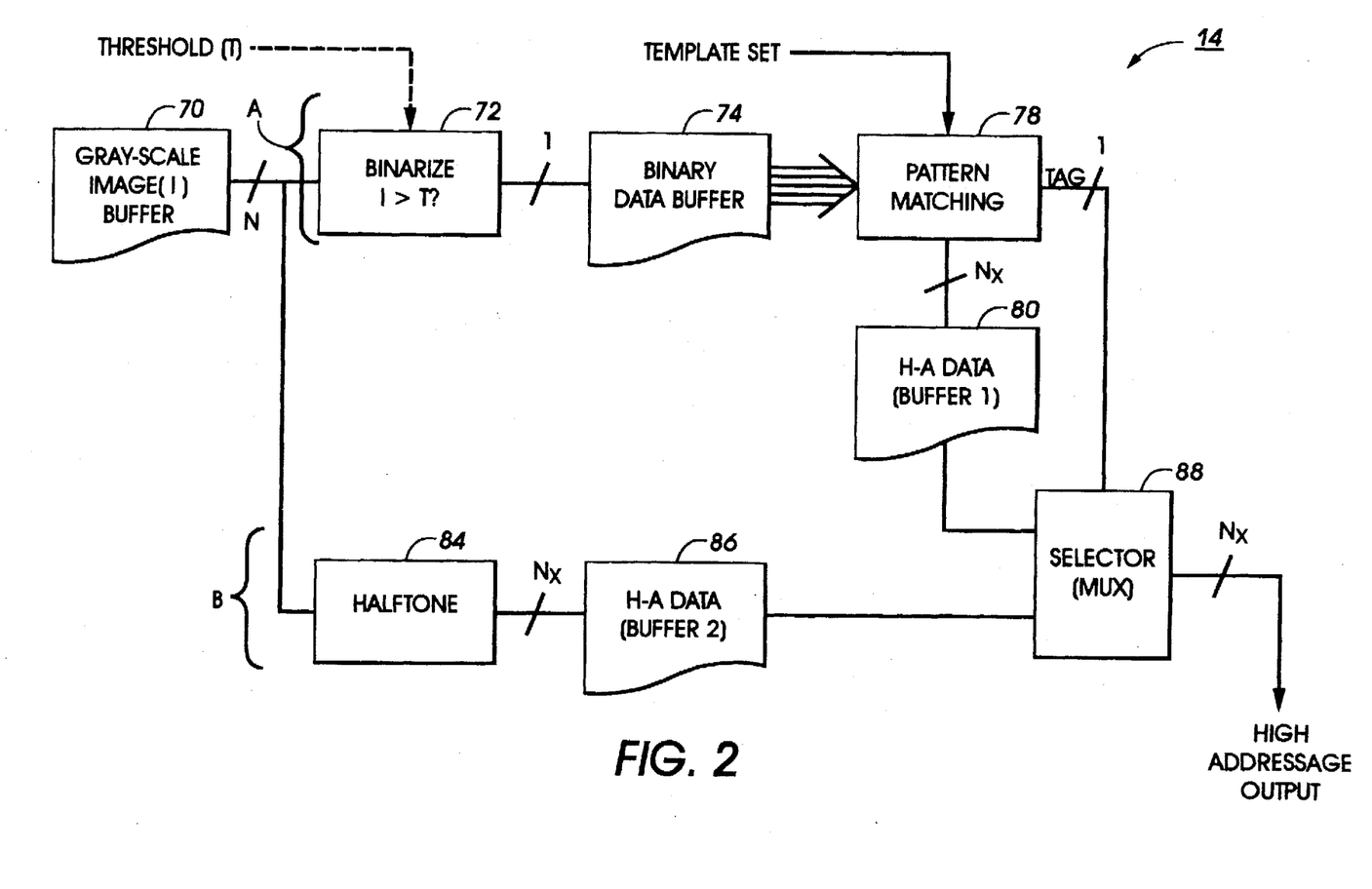
FIG. 2 is a data flow diagram of the image processing circuitry/operations necessary to accomplish image resolution enhancement in accordance with the present invention.
Figure 3:
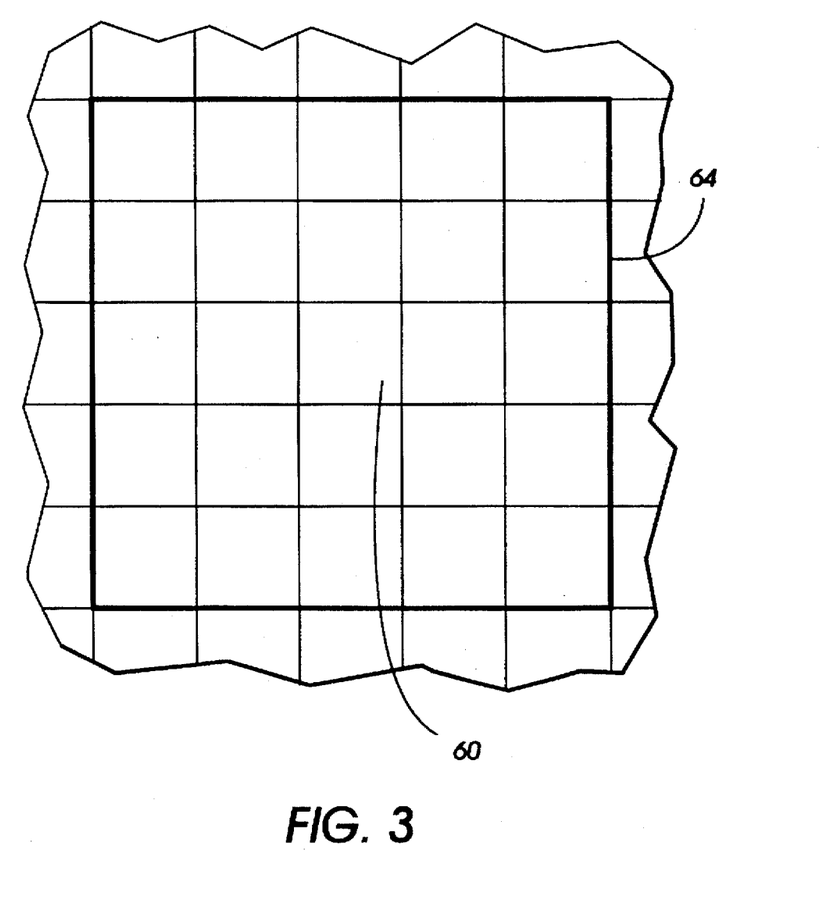
FIG. 3 is an illustration of a target pixel and 5×5 pixel window in accordance with a preferred embodiment of the present invention.

FIG. 2 is a data flow diagram illustrating the general operation of the gray-scale resolution enhancement block 12 depicted in FIG. 1. In general, a preferred embodiment comprises a parallel channel architecture as shown in FIG. 3. The input gray-scale image is passed through parallel processing paths to produce two high-addressability or gray-scale groups of image signals for each input pixel and to produce a single tag signal that will control which of two possible groups of image signals is selected for output. Channels A and B of FIG. 2 respectively represent the binary and halftone signal paths through the resolution enhancement block 14. Initially, the gray-scale image data is stored in a buffer 70. Buffer 70 is preferably an array of memory locations (RAM) suitable for storing gray-scale image data for a plurality of pixels representing at least a segment of the image to be processed.

Once stored the data in gray-scale buffer 70 is then supplied to the two parallel channels (A and B) for subsequent processing. In channel A, the gray-scale data is first thresholded (binarized) so as to produce a single binary output for each input pixel. As indicated by block 72 of FIG. 2, the binarization is accomplished by comparing the gray-scale value to a predetermined threshold value signal (T) that is input thereto. The binarization operation is accomplished using well-known arithmetic circuitry (block 72) capable of treating image data having a range of values defined by the range of the continuous tone input image data. The threshold value preferably represents a nearly saturated value (e.g., a value of 250 on a scale of 0–255, or at least 95%) so as to assure that the continuous tone portions of the image are not inadvertently mistaken for line art and text. Once binarized, the image data is stored, one bit per pixel (1 bpp), in the binary data buffer 74. Preferably, buffer 74 is capable of storing a plurality of binary image pixel signals so that sufficient image context will be provided for subsequent analysis.

Figure 4A:
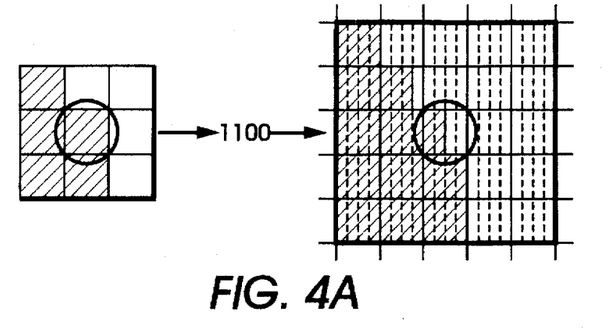
FIGS. 4A–4C are representations of various binary input—high-addressability output series illustrating the operation of various aspects of the present invention.
Figure 4B:
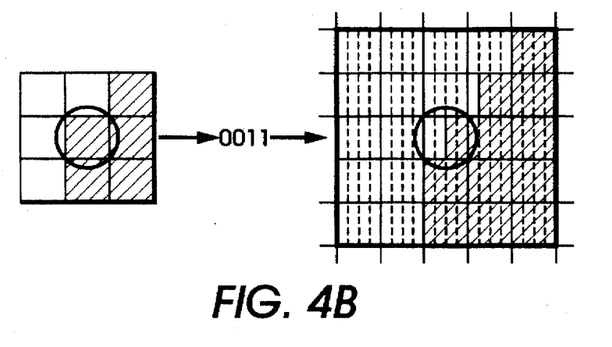
Figure 4C:
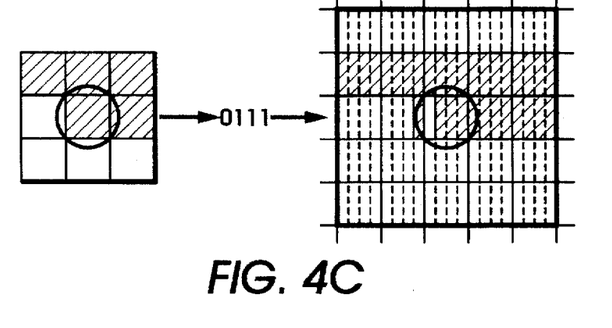
Figure 4D:
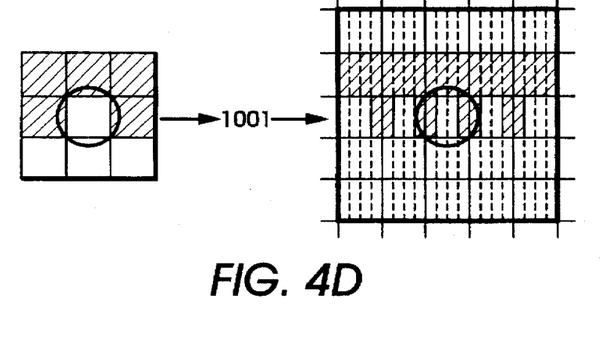

Next, data retrieval and pattern matching operations are carried out on binary data from buffer 74. Specifically, pattern matching circuit 78 compares a set of binary image signals for a target pixel 60 and pixels located in a neighborhood 64 surrounding the target pixel (see window of FIG. 4). Selection of the neighboring pixels within a window 64 is determined as a function of the template shapes employed to accomplish the enhancement operation as will be described subsequently. FIG. 4 shows an example of a square (5×5) observation window that defines the neighboring pixels, centered about a target pixel, that are used in the template matching operation. As will be appreciated by those skilled in the art, the size and shape of the observation window, and associated neighboring pixel set, may be varied.

In a preferred embodiment, the comparison may be accomplished by representing the binary states of the windowed pixels as a multi-bit binary number or binary vector. This vector can then be passed to an application specific integrated circuit (ASIC) or similar logic array (block 78) for comparison against a plurality of predefined patterns represented as templates. Alternatively, the binary vector may be input to a look-up table to accomplish the pattern matching operation. In either embodiment, the pattern matching circuit has two outputs. First, whenever a pattern is matched, the match is indicated by a 1-bit, active high tag signal. At all other times, the tag signal is set low. Second, the pattern matching circuit also generates a N-bit output signal representing the sub-pixel control signals that are preferably to be used to drive the high-addressability exposure device. An example of sub-pixel control signals is described in U.S. Pat. No. 5,504,462 by Cianciosi et al., directed to an "Apparatus for Enhancing Pixel Addressability in a Pulse Width and Position Modulated System, the relevant portions of which are hereby incorporated by reference.

It is the high-addressability gray-scale or sub-pixel image signals that enable the higher resolution images to be rendered in an acceptable manner. For example, the N-bit signal may be a signal where each bit defines the on/off state of a sub-pixel period in a high-resolution binary marking system. Alternatively, the N-bit output may be a code that is subsequently processed, for example, by passing through a look-up table, to generate signals sufficient to drive a pulse-width, position modulated exposure device as described in U.S. Pat. No. 5,504,462. In response to image patterns such as those depicted along the left side of FIG. 4, the sub-pixel values corresponding to each pattern are produced so that the image exposure will be accomplished as represented by the sub-pixel patterns on the right side of FIG. 4. In the event that no pattern is matched in pattern matching circuit 78, the output state will be all zeros (e.g., 0000/b). Using the output of the pattern matching circuit, the 1-bit tag signal may also be generated by an ORing operation. Whenever a match is detected, indicated by a non-zero output from the pattern matching circuit, the tag signal is a "1" and "0" otherwise. Once generated, the N-bit output signal is stored in a buffer or latch (Buffer 1), depicted in FIG. 2 by reference numeral 80.

Processing also occurs on channel B as represented in FIG. 2, where the gray-scale data stored in input buffer 70 is halftoned (screened) by halftone circuit 84, the output of which is a N-bit halftone signal. In one embodiment, the gray-scale output signal is a 4-bit signal essentially created by successively applying one of four threshold values associated with each pixel position within the halftone cell. The operation of an exemplary halftone circuit 84 is further characterized in pending U.S. application Ser. No. 08/285,328 by Williams et al. for "A Method and System for Processing Image Information Using Screening and Error Diffusion," the relevant portions of which are hereby incorporated by reference for its teachings on high-addressability screening and error diffusion techniques.

Once generated, the high-addressability halftone output is stored temporarily in buffer 2, indicated by reference numeral 86 in FIG. 2. As depicted, one of the values stored in Buffer 1 or Buffer 2 is then selected by reference to the tag signal previously described. Specifically, the tag signal is provided to MUX selector 88 to control the selection of the stored value to be output; the Buffer 1 data being output when the tag signal indicates a text or line art region has been detected and Buffer 2 data otherwise (i.e., a continuous tone region).

Figure 5:
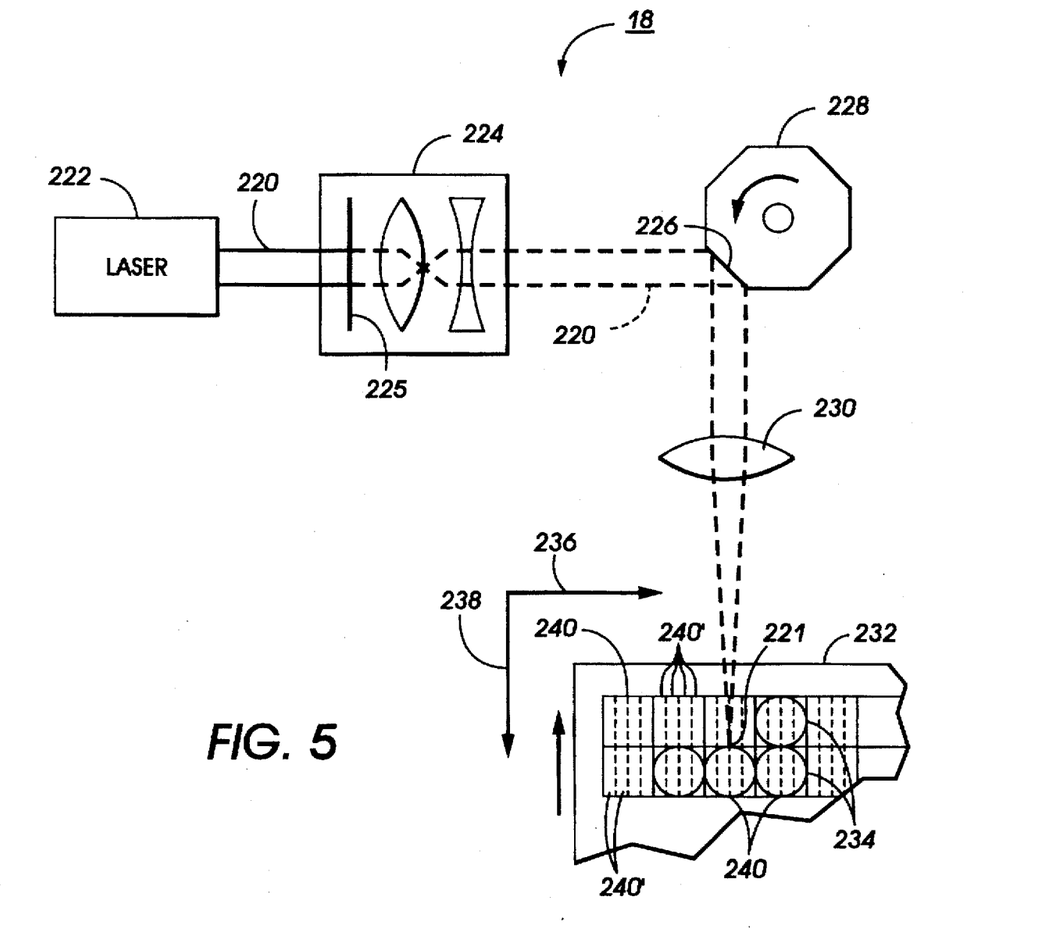
FIG. 5 is a schematic illustration of a Raster Output Scanner (ROS), illustrating a portion of the photosensitive image plane.

Referring now to FIG. 5, upon receiving the video output from resolution enhancement circuit 14 of FIG. 1, or more particularly selector 88 of FIG. 2, a marking engine 18 in the form of a raster output scanner (ROS) may be used to print the video signals of the resolution enhanced bitmap. Two common types of flying spot scanners are depicted as marking engine 18, flying spot and pulsed imaging. In both, a laser beam 220, emitted from laser 222, passes into conditioning optics 224 that may include a modulator 225. For precise periods of time, determined in response to video signals supplied to engine 18, modulator 225 either blocks or deflects the laser beam, or allows the beam to pass through the conditioning optics to illuminate a facet 226 of rotating polygon 228. Laser 222 may be a helium-neon laser or a laser diode. In the latter case, the video data could directly modulate the laser rather than modulator 225. In addition, more than a single laser source 222 or beam 220 could be employed to practice the invention. Another common image writing device is the print bar, which consists of an array of light emitting diodes or liquid crystal shutters.

Those skilled in the art appreciate that the enhanced printing mode described herein may be extended to operation employing a print bar.

After reflecting off facet 226, laser beam 220 passes through conditioning optics 230 and exposes a spot 221 on photosensitive image plane 232. The rotating facet causes laser spot 221 to scan across the image plane in a line 234. Line 234 lies in what is commonly referred to as the fast scan direction, represented by arrow 236. In addition, as facet 226 rotates, image plane 232 moves in a slow scan direction, substantially perpendicular to the fast scan direction, as represented by arrow 238. Movement in the slow scan direction is such that successive rotating facets of the polygon produce successive scan lines 234 that are offset from each other in the slow scan direction. Subsequent to exposure the latent electrostatic image remaining on photosensitive image plane 232 is developed using any commonly known charge sensitive development techniques so as to produce a developed image that is transferable to an output medium thereby producing the enhanced print.

Each scan line 234 consists of a row of pixels 240, wherein the pixels are produced by the modulation of the laser beam as laser spot 221 scans across the image plane. As beam 220 scans across the scan line, laser spot 221 either illuminates or does not illuminate the individual sub-pixel elements within a pixel period or space, in accordance with the video signals provided to ROS. In general, the video signals may be characterized as a serial stream of pulses, where a logic one or a pulse specifies that the beam is to illuminate the surface, while a logic zero, no pulse, will result in no illumination.

For both types of ROS, the width of pixel 240 is dependent upon the period or duration of the corresponding logic one pulse(s) in the video signal supplied to marking engine 18. In a scanning spot ROS, at the leading edge of a pulse modulator 225 allows the passage of laser beam 220 onto the image plane. For the duration of the pulse, an oval shaped laser spot 221 is scanned across image plane 232, illuminating a high-addressability sub-pixel 240' within pixel 240, and within the scan line 234. The width of the illuminated region in the fast scan direction thus depends on the duration of the video pulse, as well as on the width and scanning rate of laser spot 221. Typically, the dimensions of the laser spot are such that it is two to three times wider in the slow scan direction than its width in the fast scan direction. As an example, in a 600 spot per inch, 135 page per minute, dual beam printer, the laser spot at half the maximum intensity is approximately 43 µm wide in the slow scan direction and 20 µm wide in the fast scan direction, and the time period required for the spot to scan across the width of a single pixel 240 is about 15 nanoseconds.

Typically, the high-addressability video data used to drive the ROS marking engine is clocked so that the sub-pixel period within which each sub-pixel may be exposed is the same. In addition, the video data used to generate the video signal pulses that drive the modulator are also synchronized with ROS 18 and the movement of the image plane 232 in the slow scan direction, thereby allowing a particular bit of video data to address an appropriate sub-pixel portion of image plane 232. The synchronization of the video data, the video signal pulses produced therefrom, the ROS and the image plane may be achieved through the use of a system clock that is equivalent to the rate at which sub-pixel regions must be exposed on the image plane.

In one embodiment, a pulse-width, position, and amplitude modulator (pulse modulator) is utilized to form the video signal pulses in response to gray-scale or high-addressability video data representing the image to be printed. It is noted that the following description is directed toward a single color output. However, this is for the purpose of simplifying the description only and there is no intent to limit the application of the present invention in such a manner.

Turning again to the pattern matching operations, a method suitable for designing templates includes the use of suitable training documents. A design technique producing templates for use in the pattern matching operations is described, for example, in pending U.S. Pat. No. 5,696,845 by R. Loce et al., the relevant portions being hereby incorporated by reference. The training set for the high-addressability application described herein, however, requires further consideration. The special circumstances arise because of a desire to optimally position the "on" bits within each high-addressability group of pixels (each sub-grouping). In one embodiment, the position and length of the exposure is preferably controlled as a result of the pattern matching operation. Upon detecting a match between a template and the pixels of window 64, the resulting output includes both the position and pulse length information encoded therein.

The training set of digital documents may be constructed in pairs, where one member of the pair represents input image structures that the pattern matching filter circuit 78 will likely encounter in its operation. The other member of the pair represents the desired or "ideal" output. As previously described by Loce, a preferred method of obtaining such training documents is to decompose a PDL (e.g., Postscript) document to both the input and output resolutions. Unfortunately, this process fails to produce high-addressability output that is optimized for certain images, particularly near-horizontal lines.

Figure 6:
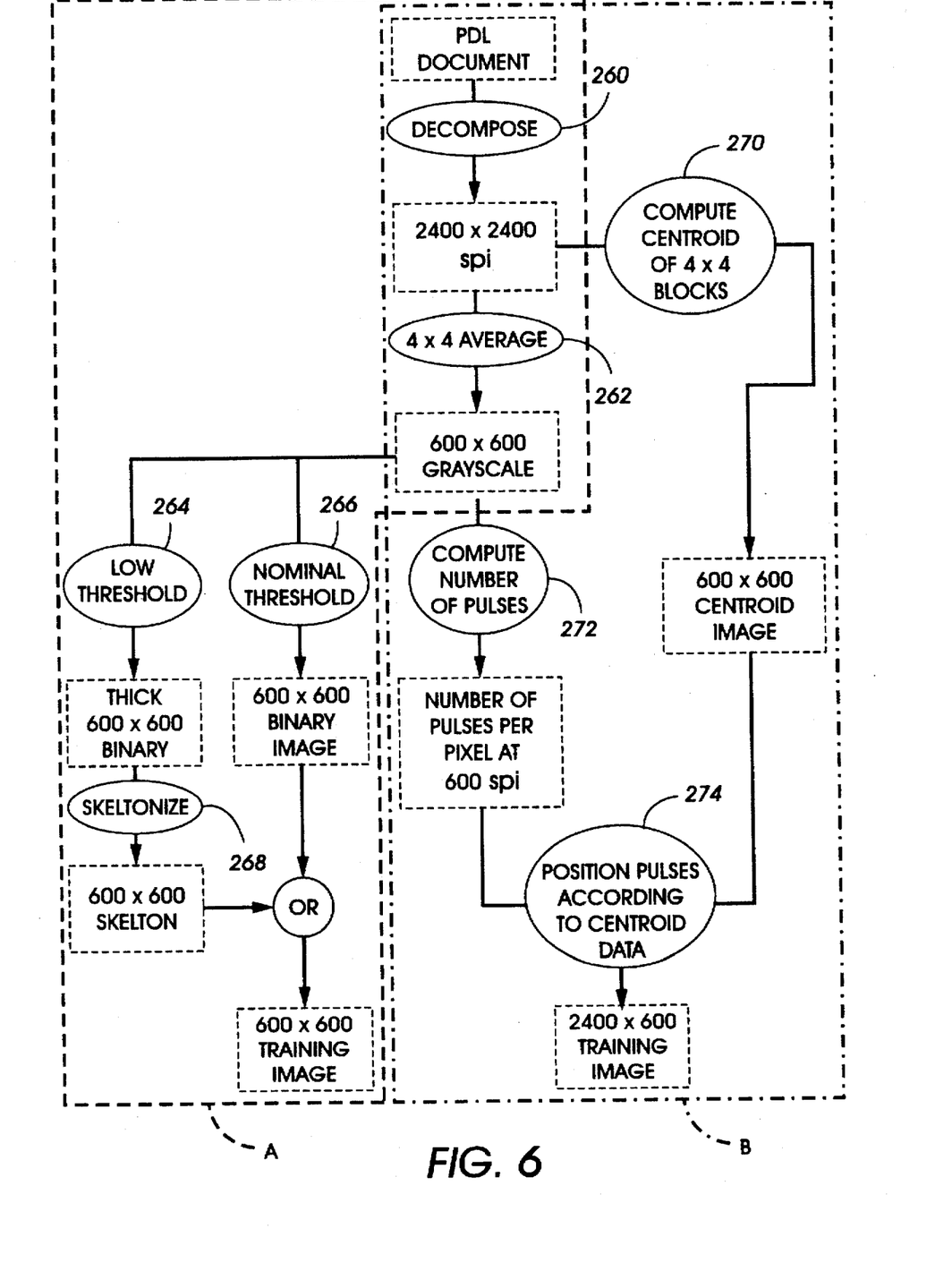
FIG. 6 is a data flow diagram generally illustrating the design steps used to produce digital filters for use in accordance with the present invention.

A preferred method for obtaining optimized high-addressability training images is a multistep process as depicted in FIG. 6. To ensure that the low resolution and high resolution images are in perfect register, it is desirable to first decompose the PDL document to a common super resolution image, say 2400×2400 spi for the resolutions mentioned above. In general, the low resolution member of the training pair (600×600 spi) may be obtained using operations depicted in the A section of the diagram of FIG. 6. 4×4 blocks of pixels are averaged and this block is replaced with a single pixel value obtained by thresholding the average. To avoid pixel dropouts in thin stoke regions, a skeleton or a skeletal subset may be ORed into the 600 spi image. The skeleton is obtained by known methods applied to the averaged 600 spi image that has been thresholded at a low level so that it is excessively thick, but does not suffer from dropouts. Acquisition of the optimal high-addressability member of the training pair is a multistep process depicted in the B section of FIG. 6.

More specifically, at step 260, the PDL target document is first decomposed to a super high-addressability bitmap. Assuming a 600×600 spot/inch (spi) output resolution, the high-addressability bitmap would be at 2400×2400 spi. Next, step 262 computes the average of each adjacent 4×4 pixel set to obtain a 600×600 spi averaged document. In the steps illustrated as Part A of FIG. 6, directed to obtaining an input training image, steps 264 and 266 apply a pair of thresholds. On a scale of 0–255, the low threshold is in the range of 0–10 and preferably on the order of 1 or 2, while the nominal threshold is in the range of 119–136 and preferably about 127 or 128. Subsequent to thresholding with the low threshold, step 268 applies a post-processing skeletonization operation to the 600×600 spi averaged image bitmap in order ensure that strokes occur without breaks. Subsequently, the binary and skeletonized images are logically ORed to produce the 600×600 spi training image. As illustrated by the steps of Part B, step 270, also operating on the 2400×2400 spi image, calculates the centroid of neighboring 4 pixel by 4 pixel blocks to produce a 600×600 centroid image. Using the 600×600 spi gray-scale image, step 272 computes the number of pulses needed to represent (print) a pixel at the 600 spi resolution based upon the average value for each 600×600 spi pixel. Specifically, step 272 determines how many 2400×600 sub-pixel pulses should be "on" in each pixel period. It should be further appreciated that the averaging and quantizing operations may be adjusted in order to produce high-addressability output for the tonal reproduction characteristics of a given marking process. In response to the outputs of steps 270 and 272, step 274 positions the proper number of pulses to produce the 2400×600 spi training image output by Part B.

Once the number of "on" pulses is determined, steps 270-272 are employed to optimally position the pulse. In a preferred embodiment step 270 determines the centroid of the 4×4 block associated with the current pixel and of 4×4 blocks both preceding and succeeding the current block. Based upon the centroid information, step 272 shifts the sub-pixel pulses: leftward if the local image structure resembles a near vertical line slanting upward to the left, rightward if the local image structure resembles a near vertical line slanting upward to the right, and no shift for near horizontal lines because the centroids are centered. The aforedescribed design process may be accomplished using 1-to-1 filter mappings and repeated N times, one for each addressable sub-pixel pulse. Thus, in a system producing a 4-bit/pixel high-addressability output from a 600 spi input image, a filter would be designed for mapping from the 600 spi input image to each of four separate pulse images (e.g., pulse-1, pulse-2, pulse-3 and pulse-4) to obtain the 4-bit output for each pixel position.

Figure 7:
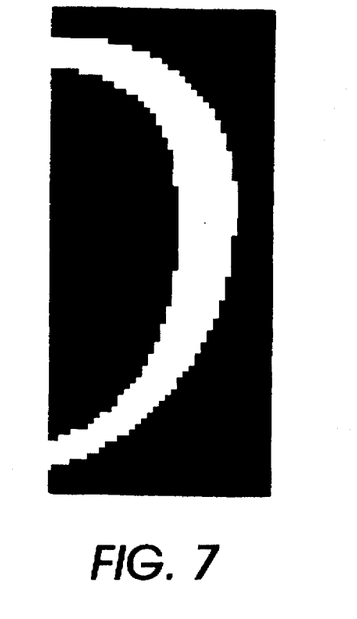
FIGS. 7 and 8 are magnified representations of segments of images, FIG. 8 representing an image segment processed in accordance with the present invention.
Figure 8:
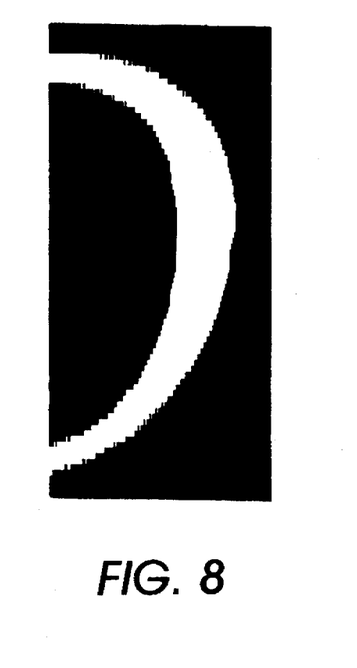

Using filters designed as described above, and applying such filters in accordance with the method and apparatus illustrated in FIG. 2, images show improved appearance due to the elimination of jaggedness in text regions such as those illustrated in FIGS. 7 and 8. In particular, FIG. 7 illustrates a text portion of printed image in a magnified condition. The image was produced using simple resolution conversion, where the bit replication was performed on the input image was to a degree that makes it compatible with the 2400× 2400 spi halftone image generated on the second channel. The objectionable jaggedness along both the horizontal and vertical slope regions of the image is apparent. FIG. 8, on the other hand, illustrates the same image region processed in accordance with the present invention. In a comparison of FIGS. 7 and 8, it is apparent that the jaggedness is replaced in FIG. 8 with high-addressability pulses that cause the sloping regions of the character to appear more uniform.

In recapitulation, the present invention is a method and apparatus for resolution enhancement of gray-scale input images that include text and line art, and more particularly to a filtering method and image processing apparatus for enhancement of high contrast line edges found in continuous tone (gray-scale) images without requiring the image data to include predetermined tag bits identifying the region types.

It is, therefore, apparent that there has been provided, in accordance with the present invention, a method and apparatus for resolution enhancement of gray-scale input images that include regions of text and line art therein. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An image processing apparatus for resolution enhancing a gray-scale digital image input thereto, the image including text and line art represented as a plurality of digitized gray-scale values, comprising:

a first channel, including a binarization circuit to binarize the gray-scale digital image and produce a binary image, and a pattern matcher for receiving the binary image and producing both a tag signal, active only when a segment of the binary image matches one of a set of template patterns, and a first high-addressability enhanced output signal;

a second channel, parallel to the first channel, for receiving the gray-scale digital image and producing a second high-addressability enhanced output signal; and a selector, responsive to the tag signal generated by the first channel pattern matcher, for selecting the high-addressability enhanced output signals from the first or second channels and outputting the selected output signals to a marking engine to produce a resolution enhanced output print.

2. The apparatus of claim 1, wherein each of the first and second high-addressability output signals represent an N-bit value for N sub-pixel elements of the output image, the N-bit value determining the exposure state for a flying spot marking engine employed to produce the output print.

3. The apparatus of claim 1, wherein each of the first and second high-addressability enhanced output signals represent an N-bit code that is subsequently interpreted to produce a pulse-width, position modulated signal to control a pulsed imaging marking engine, thereby controlling the generation of individual elements of the output image.

4. The apparatus of claim 1, wherein the binarization circuit of said first channel includes:

arithmetic circuitry for comparing gray-scale digital image data against a threshold value and producing a binary result indicative of whether the gray-scale digital data exceeds the threshold; and a binary data buffer for storing the result produced by said arithmetic circuitry.

5. The apparatus of claim 4, wherein the threshold value is at least 95% of a fully saturated continuous digital input.

6. The apparatus of claim 4, wherein the binary data stored in said binary data buffer forms a binary vector and said pattern matcher comprises an application specific integrated circuit operating on said vector to produce the first high-addressability enhanced output signal.

7. The apparatus of claim 6, wherein the first high-addressability enhanced output signal is an N-bit digital signal and said pattern matcher further includes logic circuitry for ORing each of the N bits of the first high-addressability enhanced output signal to generate the tag signal.

8. The apparatus of claim 4, wherein the binary data stored in said binary data buffer forms a binary vector and said pattern matcher comprises a look-up table operating on said vector to produce the high-addressability enhanced output signal.

9. The apparatus of claim 4, wherein said binary data buffer stores binary data for a plurality of image pixels surrounding a target pixel.

10. The apparatus of claim 9, wherein the plurality of image pixels stored in the binary data buffer includes pixels within a 5 pixel×5 pixel window centered about the target pixel.

11. A method for resolution enhancing a gray-scale digital image, the image including text and line art represented therein as a plurality of gray-scale values, comprising the steps of:

(a) thresholding the gray-scale digital image to produce a binary image;

(b) comparing a segment of the binary image to the set of template patterns and producing a first high-addressability enhanced output signal in response to a match between the segment and one of the set of predefined patterns;

(c) producing an active tag signal whenever the segment of the binary image matches one of the set of predefined patterns;

(d) producing, in response to the gray-scale digital image, a second high-addressability enhanced output signal representing a screened value for a plurality of sub-pixel elements of the output image; and (e) selecting, in response to the active tag signal generated in step (c) the first high-addressability output signals for output as resolution enhanced high-addressability output, otherwise selecting the second high-addressability output signals for output.

12. The method of claim 11, wherein steps (b) and (d) are executed concurrently.

13. The method of claim 11, wherein the segment comprises a 5×5 window within the binary image.

14. The method of claim 11, wherein the step of producing an active tag signal is accomplished by logically ORing individual bits of the first high-addressability enhanced output signal.

15. A digital printing apparatus, comprising:

an image processor for resolution enhancing a gray-scale digital image input to the digital printing apparatus, the image having text and line art regions represented as a plurality of digitized gray-scale values, said digital printing apparatus including a first channel, including a binarization circuit to binarize the gray-scale digital image and produce a binary image, and a pattern matcher for receiving the binary image and producing both a tag signal, active only when a segment of the binary image matches one of a set of template patterns, and a first high-addressability output signal, a second channel, including a high-addressability screening circuit, for receiving the gray-scale digital image and producing a second high-addressability output signal, and a selector, responsive to the tag signal generated by the first channel pattern matcher, for selecting the high-addressability output signals from either the first or the second channel and outputting the selected output signals; and a high-addressability marking engine, receiving output signals from said image processor, to produce a resolution enhanced high-addressability output print in response to the selected output signals output by said selector.

16. The digital printing apparatus of claim 15, wherein said first channel and said second channel are parallel and the processing of the digital image thereby occurs concurrently.

17. The digital printing apparatus of claim 15, wherein said first channel and said second channel each include a high-addressability data buffer for respectively storing the first and second high-addressability output signals prior to selection thereof by said selector.

* * * * *